United States Patent Office 3,477,866
Patented Nov. 11, 1969

3,477,866
PIGMENT COMPOSITION AND METHOD
OF MANUFACTURE
Robert K. Remer, Evanston, Ill., assignor to Inca Inks,
Inc., Evanston, Ill., a corporation of Illinois
No Drawing. Filed Feb. 7, 1966, Ser. No. 525,384
Int. Cl. C09b 63/00; C09c 1/04
U.S. Cl. 106—289
23 Claims

ABSTRACT OF THE DISCLOSURE

A pigment composition is made by precipitating a lake-forming hydrous metal oxide from an aqueous dispersion of a lignin and a dye selected from the group consisting of acid dyes and natural dyes. The pigment composition is a coprecipitate of a lake-forming hydrous metal oxide, a lignin and a dye selected from the group consisting of acid dyes and natural dyes.

This invention relates to pigment compositions containing organic dyes, more particularly, acid dyes and natural dyes, and to their manufacture.

The use of acid dyes and natural dyes in the past frequently has led to objectionable staining and discoloration of contacting or adjacent objects and areas, owing to their tendency to bleed when wet. This tendency has limited the use of a number of the dyes having desirable color shades and strength as colorants in various applications. For example, tartrazine produces an advantageous bright, greenish yellow shade, it has high color strength, and it is attractive from the standpoint of cost. However, tartrazine bleeds strongly when wet and it will spread to adjacent areas. It will stain moist objects which it contacts. Tartrazine thus presents a severe bleeding problem in use, and it is not used in a number of potential applications. Similarly, various other dyes either are not used in potentially desirable applications or are used with accompanying problems due to bleeding.

It would be most advantageous to provide bleed-resistant pigment compositions containing the dyes, so that the color properties of the dyes could be utilized more widely and effectively, and the cost and other advantages of the dyes could be realized. Accordingly, an important object of the invention is to overcome the bleeding problems of acid and natural dyes and provide bleed-resistant pigment compositions thereof. An accompanying important object is to provide a method of making such bleed-resistant pigment compositions.

A particular object is to provide a pigment composition containing an acid or natural dye, and a method of making the compositons, wherein lignin is incorporated for producing a bleed-resistant composition, more particularly, in combination with a lake-forming hydrous metal oxide.

Additional objects include the provision of economical pigment compositions which are well suited for various uses, and a simple and economical method of making the compositions. These and other objects, advantages and functions of the invention will be apparent from the description which follows.

It has now been discovered in accordance with the invention that the precipitation of a lake-forming hydrous metal oxide from an aqueous dispersion of a lignin and an acid dye or a natural dye produces a highly desirable bleed resistant pigment composition. The composition is bleed-resistant in water at the temperatures normally encountered in its intended uses.

In a very advantageous embodiment of the invention, the materials are precipitated on one or more of a number of solid substrate materials in finely divided form. The substrate materials impart desirable physical properties to the composition, modify the chromatic or light-transmitting characteristics of the composition, and/or serve as extenders.

In a further embodiment, a pigment composition that is bleed-resistant at higher temperatures is provided by incorporating coprecipitated metal silicate in the composition. The silicate-containing composition also has a finer particle size, and the particles are harder, which is desirable in some applications.

The new pigment compostions may be provided with a light-transmitting substrate or an opaque substrate, and they may be used to color various materials. For example, the pigment compositions may be incorporated in printing ink, paint, and coating emulsions containing resin binders, in wax and oleaginous liquid and solid emulsions, and in film-forming plastic compositions. They may be admixed with plastic molding powders. Powdered materials may be plated by tumbling the pigment compositions therewith.

The invention is applicable generally to the acid class of synthetic dyes and to the natural dyes. These dyes have a tendency to bleed to a greater or lesser extent when wetted with water, so that they are objectionable or unsuitable for use in many applications. The following Tables I–II list a number of the more significant dyes to which the invention applies, including in Table I, dyes of the preferred sub-classes of aminoketone, azo, indigoid, nitro, nitroso, triarylmethane, and xanthene dyes, and in Table II, preferred natural dyes. The dye numbering refers to the Colour Index, Second Edition. One or more of the dyes may be employed in producing desired colors. It will be understood that the dyes listed in Tables I and II are only illustrative of preferred dyes, and the invention is not limited thereto.

TABLE I.—ACID DYES

| C.I. Usage Number (Classical Name) | C.I. Number | Dye Class |
|---|---|---|
| Acid Yellow 1 | 10316 | Nitro. |
| Acid Yellow 7 | 56205 | Aminoketone. |
| Acid Yellow 17 | 18965 | Azo. |
| Acid Yellow 23 (Tartrazine) | 19140 | Azo. |
| Acid Yellow 29 | 18900 | Azo. |
| Acid Yellow 42 | 22910 | Azo. |
| Acid Yellow 73 (Uranine) | 45350 | Xanthene. |
| Acid Yellow 99 | 13900 | Azo. |
| Food Yellow 3 | 15985 | Azo. |
| Acid Orange 1 | 13090/1 | Azo. |
| Acid Orange 10 | 16230 | Azo. |
| Acid Orange 20 (Orange I) | 14600 | Azo. |
| Acid Orange 76 | 18870 | Azo. |
| Food Orange 2 | 15980 | Azo. |
| Orange B * | | Azo. |
| Acid Red 1 | 18050 | Azo. |
| Acid Red 4 | 14710 | Azo. |
| Acid Red 18 | 16255 | Azo. |
| Acid Red 26 | 16150 | Azo. |
| Acid Red 27 | 16185 | Azo. |
| Acid Red 51 (Erythrosine) | 45430 | Xanthene. |
| Acid Red 52 | 45100 | Do. |
| Acid Red 73 | 27290 | Azo. |
| Acid Red 87 (Eosine) | 45380 | Xanthene. |
| Acid Red 94 | 45440 | Do. |
| Acid Red 194 | | Azo. |
| Food Red 1 | 14700 | Azo. |
| Acid Violet 7 | 18055 | Azo. |
| Acid Violet 49 | 42640 | Triarylmethane. |
| Acid Blue 1 | 42045 | Do. |
| Acid Blue 9 | 42090 | Do. |
| Acid Blue 22 | 42755 | Do. |
| Acid Blue 74 | 73015 | Indigoid. |
| Acid Blue 93 | 42780 | Triarylmethane. |
| Acid Blue 158A | 15050 | Azo. |
| Acid Green 1 | 10020 | Nitroso. |
| Acid Green 3 | 42085 | Triarylmethane. |
| Acid Green 5 | 42095 | Do. |
| Acid Green 16 | 44025 | Do. |
| Food Green 3 | 42053 | Do. |
| Acid Black 1 | 20470 | Azo. |

*Commercial name.

TABLE II.—NATURAL DYES

| Common Name | C.I. Usage Number | C.I. Number |
| --- | --- | --- |
| Alkanet | Natural Red 20 | 75520, 75530 |
| Annatto | Natural Orange 4 | 75120 |
| Carotene | Natural Yellow 26 | 75130 |
| Chestnut | | |
| Cochineal | Natural Red 4 | 75470 |
| Cutch | Natural Brown 3 | 75250, 75260 |
| Divi-Divi | Natural Brown 6 | |
| Fustic | Natural Yellow 11 | 75240, 75660 |
| Hypernic | Natural Red 24 | 75280 |
| Logwood, oxidized and unoxidized | Natural Black 1 | 75290 |
| Osage Orange | Natural Yellow 8 | 75660 |
| Paprika | | |
| Quercitron | Natural Yellow 10 | 75720 |
| Saffron | Natural Yellow 6 | 75100 |
| Sandal Wood | Natural Red 22 | 75510, 75540, 75550, 75560 |
| Sumac | Natural Brown 6 | |
| Turmeric | Natural Yellow 3 | 75300 |

The lignin employed in the invention is any one of various available lignin products which is soluble or may be solubilized in aqueous medium, including lignosulfonates and alkali lignins. The lignin may be crude or purified including sugar containing and desugared lignin products. The lignin may be obtained from angiosperms, particularly hardwoods, or from gymnosperms, particularly softwoods, especially the conifers, by the kraft and soda alkaline processes, the products of which may be sulfonated, and by the sulfite, bisulfite, neutral sulfite, and acid (Scholler lignin) processes. The lignin is preferably purified or refined, such as by precipitation to separate the lignin from non-ligneous matter, as described in U.S. Patent Reissue No. 18,268, or by ion exchange or electrodialysis. The lignin is employed in soluble form, e.g., as an ammonium, sodium, potassium, lithium, calcium or magnesium salt. Insoluble forms may be solubilized by known methods. Preferred lignin products are those containing about 30% or more of lignin or lignosulfonate, by weight.

Typical lignosulfonates which may be employed in the invention include the Rayligs (Rayonier Incorporated), the Toranils and Stractan (St. Regis Paper Company), the Maracarbs (American Can Company), the Orzans (Crown Zellerbach Corporation), and the Polyfons (West Virginia Pulp & Paper Company).

Illustrative of the Raylig lignosulfonates are the Raylig-TA and Raylig-LA sodium lignosulfonate products. Raylig-TA contains 61.5% lignosulfonate as the sodium salt and 28.3% total sugar. The pH of a 1% solution is 6.2. Raylig LA-74 is sugar-free sodium lignosulfonate, having a pH in 1% solution of 6.6. Raylig LA-79 is sugar-free modified sodium lignosulfonate having a lesser content of hydrophilic groups. Its pH in 1% solution is 7.9.

The Toranils are produced from desugared extract of coniferous woods. They contain about 96% calcium lignosulfonate and 4% total carbohydrates. The average molecular weight is about 1000, and the average molecule is believed to have about 3 methoxyl, 5 hydroxyl, and 2 sulfonate groups. Toranil A is a 50% solution in water, and Toranil B is a water soluble powder containing 94% dry solids. The pH of a 50% solution is 4.5–4.7.

The Maracarbs are mixtures of lower molecular weight lignosulfonic acid, carboxylic acid, and hydroxy-carboxylic acid salts. Maracarb N is supplied as a liquid or as a powder obtained by spray drying the liquid. The liquid is neutral in pH and contains about 50-52% solids in aqueous solution, and the solids contain about 30–40% sodium lignosulfonate and 55–65% carbohydrate and carbohydrate reversion products. Maracarb NC is a water soluble powder containing sodium calcium salts of lignosulfonic acid, carboxylic acid, and hydroxycarboxylic acid, there being about 32–42% of lignosulfonate and 56–66% of carbohydrate and carbohydrate reversion products.

The Orzans include Orzan A, a water soluble spray-dried powder containing 59.1% lignin sulfonic acids as ammonium lignosulfonate and 17.5% reducing sugars as glucose. Its pH in 30% solution is 4.3. Orzan S is water soluble spray-dried powder containing 57.6% lignin sulfonic acids as sodium lignosulfonate and 11.6% reducing sugars. Its pH in 30% solution is 7.0. Orzan AL-50 is a 50% solids solution of Orzan A, and Orzan SL-50 is a 50% solids solution of Orzan S.

The Polyfons are sodium lignosulfonates with varying proportions of sodium sulfonate groups as follows: Polyfon H, 5.8%; Polyfon O, 10.9%; Polyfon T, 19.7%; Polyfon R, 26.9%; and Polyfon F, 32.8%. The Polyfons are soluble in water, their solutions ranging in pH from about 8 to 10.6. The primary raw material is purified pine wood lignin. Sugars, hemicelluloses and other cellulose degradation products are removed in processing and are not present in the products.

Illustrative alkali lignins are the Indulins (West Virginia Pulp & Paper Company). They are produced by pulping pine wood by the kraft process, wherein the lignin is subjected to alkaline hydrolysis by sodium hydroxide and sodium sulfide. A unit weight of 840 is used for calculating combining weights. Indulin A is a purified lignin, consisting of over 99.5% of organic material. It is insoluble in water and acids, and soluble in alkali. Its pH is between 3 and 4.5. Indulin B is a purified sodium salt of lignin containing approximately 4% of sodium. It is insoluble in acids, and soluble in water and alkali. Its pH ranges from 8 to 9. Indulin C is a crude sodium salt of lignin containing 9.8% of sodium. Part of the sodium is combined with lignin as sodium lignate and part is present in the form of free sodium salts, largely sodium carbonate. It contains some occluded black liquor. It is insoluble in acid, and soluble in water and alkali. Its pH ranges from 9 to 10.

The lake-forming hydrous metal oxide is a hydrous oxide which precipitates and serves as an adsorption substrate in forming a color lake with an organic soluble dye. The lake-forming hydrous metal oxides are typically used to form lakes with acid dyes. In forming the lakes, the hydrous metal oxides are precipitated from aqueous solutions of soluble metal compounds and the dyes.

The preferred lake-forming hydrous metal oxides are the hydrous oxides of the metals aluminum, chromium, cobalt, copper, iron, lead, magnesium, tin, titanium, zinc, and zirconium. The oxides preferably are precipitated from aqueous solutions of soluble salts, such as their halides, nitrates, sulfates, and acetates. Illustrative salts include aluminum chloride, aluminum sulfate, aluminum potassium sulfate, aluminum ortho phosphate, potassium dichromate, cobaltous chloride, cuprous chloride, ferrous sulfate, potassium ferrocyanide, sodium ferrocyanide, lead nitrate, lead acetate, magnesium chloride, stannous chloride, titanium tetrachloride, zinc chloride, and zirconium oxychloride. Mixtures of different metal salts may be employed for precipitating mixed metal oxides.

The hydrous metal oxides are produced from the soluble metal compounds by providing a pH in solution sufficient to precipitate the hydrous oxide and thereby form a lake. For this purpose, an alkaline material is admixed with the solution. Preferred alkaline materials include the alkali metal hydroxides and carbonates, ammonium hydroxide, and basic amines, e.g., triethanolamine and benzyltrimethylammonium hydroxide.

The hydrous metal oxides vary in their ability to mordant the dye in the presence of lignin, pursuant to the invention. Thus, with reference to use with the dye tartrazine, a notorious bleeder, the hydrous oxides of aluminum, lead, tin and zirconium are found to be most effective in producing bleed-resistant compositions and, therefore, are preferred. The hydrous oxides of aluminum and zirconium are further preferred. The preferred compositions are substantially non-bleeding, exhibiting extremely small color bleed in water. The compositions employing the hydrous oxides of chromium, cobalt, copper, iron, magnesium, titanium, and zinc exhibit very low bleed under the same conditions, although greater than the foregoing preferred compositions.

The preferred alumina hydrate lakes advantageously are produced with aluminum chloride or an aluminum sulfate. Lakes produced with aluminum chloride and alkali metal hydroxide are hygroscopic in the absence of an extender substrate. Such lakes may be employed where hygroscopicity is not a factor, or where the product is to be used shortly or may be kept out of contact with moisture until use. A non-hygroscopic alumina hydrate lake may be prepared from aluminum sulfate or potassium aluminum sulfate and sodium carbonate. The alumina hydrates are transparent, and the pigment compositions formed with alumina hydrates are useful where it is necessary or desirable that the substrate be transparent.

The preferred zirconia hydrate lakes advantageously are produced from zirconium oxychloride, which is available at low cost, or from zirconium nitrate or sulfate. The hydrous oxide is precipitated from a solution of the salt conveniently by an alkali metal carbonate or hydroxide, preferably the former for softer pigments, and the products are non-hygroscopic. The hydrous zirconium oxide is transparent and suitable for use where it is desired that the pigment composition have a transparent substrate.

Previously, aluminum, zirconium, and other of the lake-forming metals were known to precipitate dyes by forming salts of the dyes. It is to be expected that similar reactions take place in forming the pigment compositions of the present invention, along with the formation of hydrous metal oxides. However, the dye salts or toners bleed in water. In the invention, the hydrous metal oxides are produced for lake formation, and lignin is employed therewith, to produce bleed-resistant pigment compositions. The quantities of metal salt employed are substantially greater than reaction quantities for metal dye salt formation.

The lake-forming hydrous metal oxide may be precipitated on a finely divided solid substrate to form an intimate mixture therewith having the dye uniformly dispersed throughout the resulting pigment composition and bound therein so as to be bleed-resistant on the substrate. The solid substrate may serve as a low cost extender, provide a desirable particle size, increase the covering power or transparent base, furnish a suitable texture and flow, improve the oil absorption, vary the color shade or strength, or otherwise impart desirable properties to the composition.

Any of numerous extender substrate materials may be employed, including various natural and synthetic inorganic and organic finely divided solids and mixtures thereof. The particles of the substrate materials when dispersed in the precipitation medium preferably fall in the range of from colloidal size to about 100 microns, i.e., with about 95% or more of the particles falling within such range. It is further preferred that the particles in the ultimate dispersion have an average particle size less than about 1 micron. A reduction in particle size may be effected by shear mixing the dispersion.

Preferred solid substrate materials include the clay minerals, insoluble metal oxides, carbonates, sulfates, and silicates, microcrystalline cellulose, and ultra fine polyolefin powders. The clay minerals are represented by the kaolinite group, the montmorillonite group, the potash clay or hydrous mica group, and attapulgite. Representative available materials include china clay, Ultra White 90 kaolin clay and Attagel Attapulgus clays (both from Minerals & Chemicals Philipp Corporation), and Volclay bentonite (American Colloid Company).

Other substrate materials include natural and synthetic oxides, carbonates, sulfates, and silicates of aluminum, barium, calcium, magnesium, silicon, and titanium, including chemical or physical combinations or mixtures thereof. Exemplary materials are titanium dioxide, calcium carbonate, calcium magnesium carbonate, calcium sulfate, calcium silicate, barium carbonate, barium sulfate, magnesium carbonate, magnesium silicate, Zeolex synthetic silico-aluminates (J. M. Huber Corporation), colloidal silica such as the Nalcoags (Nalco Chemical Company), micron sized silica such as the Syloids (W. R. Grace & Co.), colloidal aluminas such as Baymal (E. I. du Pont de Nemours & Co.), coprecipitated alumina hydrate-barium sulfate or gloss white, coprecipitated alumina hydrate-calcium sulfate or satin white, and green earth, a natural hydrous iron, magnesium, aluminum and potassium silicate. Blends of various solid substrate materials may be employed for imparting desired properties to the pigment composition.

The lake-forming hydrous metal oxide may be precipitated in a metal oxide-silicate coprecipitate. For this purpose, a soluble silicate is admixed with the solution containing a soluble compound of a metal forming such hydrous metal oxide, as described above. The soluble silicate preferably is an alkali metal or organic ammonium silicate.

In making the new pigment composition according to a preferred method, the dye and the lignin are dissolved in aqueous medium, preferably with heating. Preferably, at least about 0.1 part of lignin is employed per part of dye, by weight, based upon the lignin content of the lignin product used, and only sufficient lignin is employed to produce the desired bleed-resistant pigment composition.

The natural dyes such as those listed in Table II may be employed in the form of their available extracts or concentrates. Alternatively, they may be extracted from their source materials with aqueous lignin solutions. Preferably, the extraction takes place at an elevated temperature of about 160–212° F. The lignin may be employed in the amount desired for making the pigment composition, or an excess over that amount may be preferable for better extraction. After separating extracted residue, the resulting dye-lignin solution is used to make the pigment composition.

Where a solid extender substrate is employed, it is dispersed in aqueous medium. The dispersion may be assisted by incorporating a small amount of surfactant, and a small amount of antifoam may be added in mixtures which tend to foam.

The dye-lignin solution is intimately mixed with the substrate dispersion. The materials preferably are shear mixed at high speed and at an elevated temperature, preferably in the range of about 120–180° F., to intimately mix and disperse the ingredients. In a preferred procedure, a quantity of acid is added to the resulting mixture, if necessary, to provide a pH in the mixture following succeeding addition of lake-forming metal compound of about 3 or lower, preferably 2.8–3. Such acid addition produces a smaller particle size pigment composition.

An aqueous solution of a compound of a lake-forming metal is admixed with the foregoing mixture. In a preferred procedure, an alkaline material in aqueous solution then is added to the mixture slowly and thoroughly mixed therewith, preferably by shear mixing. The additions preferably are accompanied by continued heating to about 120–180° F., more preferably 140–180° F. Hydrous metal oxide gel formation takes place with the addition of the alkaline material.

The lake-forming metal compound is employed in an amount sufficient to mordant or lake the dye with the hydrous metal oxide precipitated therefrom. The amount varies with the metal, with the type of compound, and with the dye. In general, the amounts of lake-forming compounds correspond to those amounts previously employed for producing color lakes, and specific amounts are readily evaluated by routine testing and observation of the results. Employing the preferred aluminum and zirconium salts, it is preferred to incorporate at least about 0.3 part of aluminum and at least about 0.8 part of zirconium, respectively, per part of dye, by weight.

The alkaline material is employed in an amount providing a pH in solution sufficient to precipitate the metal in a hydrous metal oxide lake. The laking pH varies with the metal employed, as is known, and generally, the pH is in the range of about 4.2–7.2. The pH at the completion of addition of alkaline material is preferably in the range of about 6.8–7.2 for alumina hydrate and about 5.2–6.5 for zirconia hydrate precipitation.

The precipitated mixture may be treated to modify the particle size and to fix small amounts of excess dye, where such treatments appear necessary or desirable. The particle size may be reduced by treatment with ammonium hydroxide where precipitation was effected with another alkaline material. Excess dye is fixed by the addition of such materials as morpholine, zirconium oxychloride, and methylene disalicylic acid.

As indicated above, the foregoing steps are conducted preferably at an elevated temperature of about 120–180° F. Precipitation preferably is completed at 140–180° F. However, the steps may be conducted at lower temperatures with accompanying rate decreases.

The precipitated mixture is laked by slow mixing at ambient temperature, during which the heated mixture cools. The mixture is quenched by the addition of cold water and allowed to stand. A color lake settles, and it is separated from the liquor and washed. The resulting pigment composition may be employed wet, or it may be dried to a moisture content of about 0.5–7%, by weight, such as by vacuum drying or spray drying from aqueous dispersion.

The extender substrate may be omitted, especially when it is desired to produce a pigment composition having only transparent substrate such as alumina or zirconia hydrate substrate. In this case, the lake-forming metal compound solution is added to the dye-lignin solution, and the alkaline material is added to the resulting solution. The resulting gel-containing mixture may be treated similarly to reduce the particle size and fix excess dye.

When the dye is laked with coprecipitated hydrous metal-oxide-silicate, a solution containing a soluble silicate is mixed with a solution containing the soluble metal compound in the last mixing operation and the resulting mixture has an acid pH sufficient to precipitate the metal as oxide-silicate. The amount of soluble silicate added is below an amount which will combine with all of the metal, and the amount may be varied depending upon the modification of the pigment composition that is desired. The metal to dye ratio may vary from the ratio in the absence of silicate. Thus, for example, a lower aluminum:dye ratio may be employed, e.g., down to about 0.2:1, in parts by weight, and a higher zirconium:dye ratio is preferable, e.g., above about 1.5:1.

The dye preferably is present in the pigment composition in a proportion of about 1 to 50% by weight of the total substrate, including hydrous metal oxide or oxide-silicate and extender substrate. The extender substrate is employed in a quantity suitable for providing the color strength, color shade, covering power, or other characteristic desired for the pigment composition.

The new pigment compositions contain coprecipitated dye, hydrous metal oxide substrate, and when included, metal silicate and/or extender substrate. The compositions contain more or less of the lignin, depending upon the precipitant materials, some of which separately precipitate part of the lignin. Thus, for example, when a pigment composition is precipitated from aluminum sulfate or zirconium oxychloride solution, part of the lignin precipitates out separately in the reaction vessel, and part of the lignin is incorporated in the pigment composition. The composition may be separated from the separately precipitated lignin, such as by decantation.

The pigment compositions exhibit the desired bleed resistance when wetted at ambient temperatures as encountered in normal use. Thus, for example, tartrazine compositions are bleed-resistant to at least 100° F. in water, and at higher temperatures when they include silicate. The compositions are much superior in this respect to the prior compositions. The pigment compositions may be incorporated with various materials in the same manner as with prior pigments.

The following examples are illustrative of the invention. It is to be understood that the invention is not limited to the examples or to the materials, proportions, procedures, and conditions set forth therein.

EXAMPLE 1

A pigment composition having a transparent substrate is made in the following manner: The following composition is heated at 160–180° F. to dissolve the dye and mixed for 15 minutes with a shear blade operating at 500–800 r.p.m.:

Composition 1

| | |
|---|---|
| Water _____ml__ | 1000 |
| Tartrazine _____gms__ | 180 |
| Sodium lignosulfonate, 61.5% (Raylig TA) _gms__ | 60 |

A solution of 825 gms. of aluminum chloride $$(AlCl_3 \cdot 6H_2O)$$

in 1800 ml. of water is added to the foregoing solution. The resulting solution is shear mixed with heating at 145–150° F. for 10–15 minutes.

A solution of 160 gms. of sodium hydroxide in 1600 ml. of water is added to the preceding mixture at a flow rate of about 100 ml./min. while shear mixing. The temperature is maintained at 145–150° F. The resulting mixture containing alumina hydrate gel is shear mixed for 10 minutes.

A solution of 60 ml. of ammonium hydroxide (28%) in 400 ml. of water is added to the preceding mixture at a flow rate of about 60 ml./min. while maintaining the temperature at 145–150° F. and shear mixing. The ammonium hydroxide reduces the particle size of the agglomerates. Alternatively, an equivalent amount of sodium hydroxide may be added, with resulting larger particles.

A solution of 20 ml. of morpholine in 80 ml. of water is added to the preceding mixture at a flow rate of about 10 ml./min. while shear mixing. The mixture is maintained at 145–150° F. with mixing for one hour, when heating is discontinued. The morpholine serves to fix small amounts of excess dye. Alternatively, the morpholine solution may be replaced by a solution of 50 gms. of zirconium oxychloride ($ZrOCl_2 \cdot 8H_2O$) in 100 ml. of water. In a further alternative, the morpholine may be replaced by a solution of 20 gms. of methylene disalicylic acid in 200 ml. of Cellosolve.

The resulting mixture is laked for 1–5 hours with slow mixing. An equal volume of tap water then is added to the mixture. The pigment composition may be separated from the liquor by filtration. Alternatively, the mixture may be allowed to stand, and the pigment composition settles. The liquor then may be separated from the pigment by decantation and/or filtration or centrifugation. The pigment composition may be employed wet, in paste type colors, or it may be dried to 0.5–7% moisture for use, such as by vacuum drying or spray drying at 200–300° F.

The pigment composition may be employed in a printing ink as follows: A 25 gm. quantity of dried pigment composition is shear mixed with 75 gms. of conventional (a) oleoresinous alkyd varnish, (b) rotogravure varnish in solvent, or (c) flexographic varish in solvent. The mixture is given one pass on a three roller ink mill. The ink is tested for stability and then may be used on a printing press.

The pigment composition may be mixed with an aqueous fluid or solid emulsion of an oleaginous substance such as a vegetable oil in a proportion of about 1 part of dry composition to 40 parts of oleaginous substance, in parts by weight.

EXAMPLE 2

A non-hygroscopic pigment composition having a transparent substrate is made in the following manner: Composition 1 of Example 1 is heated at 160–180° F. and shear mixed. A solution of 825 gms. of aluminum sulfate ($Al_2(SO_4)_3 \cdot 18H_2O$) in 1800 ml. of water is added to the foregoing solution. The resulting solution is shear mixed with heating at 145–150° F. for 10–15 minutes.

A solution of 160 gms. of sodium hydroxide or 270 gms. of sodium carbonate (anhydrous) in 1600 ml. of water is added to the preceding mixture at a flow rate of about 100 ml./min. while shear mixing. The temperature is maintained at 145–150° F. The mixture is shear mixed for 10 minutes, when heating is discontinued.

The resulting mixture is laked for 1–5 hours with slow mixing. An equal volume of tap water is added, and the mixture is allowed to stand until the pigment composition settles. The pigment composition is separated from the liquor, by decantation, filtered and may be dried, as in Example 1.

EXAMPLE 3

Examples 1 and 2 are repeated, substituting Acid Blue 9 (Brilliant Blue FCF) for tartrazine in the same quantity, with similar results.

Examples 1 and 2 may be repeated with any of the dyes listed in Table I in amounts of about 100–200 gms. for various average color shades.

EXAMPLE 4

A pigment composition having a transparent substrate is made in the following manner: The following composition is heated at 200° F. and shear mixed for 60 minutes to extract the cochineal dye:

Composition 2

| | |
|---|---:|
| Water _____ml__ | 1000 |
| Cochineal sacs (about 20% dye content) __gms__ | 100 |
| Sodium lignosulfonate, 61.5% (Raylig TA) _gms__ | 50 |

The mixture is cooled to room temperature and filtered to remove the extracted residue. The pH of the solution is adjusted to 6 to 6.5 by addition of aqueous aluminum potassium phosphate, citric acid, or tartaric acid solution. Owing to the poor stability of the dye, strong acids are avoided.

A solution of 123.5 gms. of aluminum chloride in 800 ml. of water is added to the foregoing solution. The solution is shear mixed with heating at 120° F. for 10–15 minutes.

A solution of 41.6 gms. of sodium carbonate in 500 ml. of water is added to the preceding mixture at a flow rate of about 100 ml./min. and at 120° F. while shear mixing. The mixture is heated at 140–180° F. with shear mixing for 15 minutes, when heating is discontinued.

The resulting mixture is laked for 1–5 hours with slow mixing. An equal volume of tap water is added, and the mixture is allowed to stand until the pigment composition settles. The pigment composition is separated from the liquor by decantation, filtered and dried.

EXAMPLE 5

Example 4 is repeated, substituting for cochineal any of the remaining natural dyes of Table II employing appropriate amounts of generally about 50–100 gms. of the ground vegetable source materials. Alternatively, extracts of the dyes produced in other ways may be employed, and the lignin may be mixed therewith as in Example 1.

EXAMPLE 6

A pigment composition is made as follows: Composition 1 of Example 1 is heated at 160–180° F. and shear mixed 15 minutes. The following composition is shear mixed for 15 minutes:

Composition 3

| | |
|---|---:|
| Water _____ml__ | 3500 |
| Silico-aluminate powder (Zeolex 7)[1] _____gms__ | 840 |
| Bentonite, powdered (Volclay)[2] _____gms__ | 80 |
| Silicone antifoam (Antifoam B) _____ml__ | 0.1–0.2 |
| 3,5-dimethyl-1-hexyn-3-ol surfactant (Surfynol 61) _____ml__ | 0.5 |

[1] Zeolex 7: Precipitated, dried silico-aluminate powder having the following composition and properties:

| | |
|---|---:|
| $SiO_2$ _____percent__ | 66–68 |
| $Al_2O_3$ _____do____ | 11–13 |
| $Na_2O$ _____do____ | 5–7 |
| Loss on ignition at 900° C. _____do____ | 11–13 |
| Color _____ | Bright White |
| Mean particle diameter, millimicrons _____ | 22 |
| 325 mesh screen residue _____percent max__ | 0.1 |
| Oil absorption, gms./100 gms. _____ | 135 |
| pH _____ | 7.0 |

[2] Volclay: Containing 90% sodium montmorillonite and having the following composition and properties:

| | |
|---|---:|
| $SiO_2$ _____percent__ | 63.07 |
| $Al_2O_3$ _____do____ | 21.08 |
| $Fe_2O_3$ _____do____ | 3.25 |
| MgO _____do____ | 2.67 |
| $Na_2O$ _____do____ | 2.20 |
| Chemically held water _____do____ | 5.64 |
| FeO, $TiO_2$, CaO, $K_2O$, other minor constituents _____Fractional percents | |
| Particle size in water: | |
| Finer than 325 mesh (44 microns) _____percent__ | 96–97 |
| Finer than 5 microns _____do____ | 93–94 |
| Finer than 0.5 micron _____do____ | 87–89 |
| Finer than 0.1 micron _____do____ | 60–65 |
| Specific gravity _____ | 2.7 |
| pH of water suspensions _____ | 8.5–10 |
| Exchangeable Na, K, Ca, and Mg, meq./100 gms. _____ | 85–90 |

The water and the silico-aluminate may be added in one or more portions.

Composition 1 is added to Composition 3. The resulting mixture is shear mixed with heating at 145–150° F. for 5–10 minutes. A temperature of 145–150° F. is maintained in the mixture during subsequent additions, until the laking period commences.

A solution of 825 gms. of aluminum chloride in 1800 ml. of water is added to the foregoing mixture. The resulting mixture is shear mixed for 10–15 minutes.

A solution of 160 gms. of sodium hydroxide in 1600 ml. of water is added to the preceding mixture at a flow rate of about 100 ml./min. while shear mixing. The resulting mixture containing alumina hydrate gel is shear mixed for 10 minutes.

A solution of 60 ml. of ammonium hydroxide (28%) in 400 ml. of water is added to the preceding mixture at a flow rate of about 60 ml./min. while shear mixing.

A solution of 20 ml. of morpholine in 80 ml. of water is added to the preceding mixture at a flow rate of about 10 ml./min. while shear mixing. The mixture is maintained at 145–150° F. with mixing for one hour, when heating is discontinued. Alternatively, the morpholine solution may be replaced by a solution of 50 gms. of zirconium oxychloride ($ZrOCl_2 \cdot 8H_2O$) in 100 ml. of water. In a further alternative, the morpholine may be replaced by a solution of 20 gms. of methylene disalicylic acid in 200 ml. of Cellosolve.

The resulting mixture is laked for 1–5 hours with slow mixing. An equal volume of tap water is added to the mixture and the pigment composition is allowed to settle. The pigment is separated from the liquor by decantation, filtered and may be dried, as in Example 1.

Either the bentonite or the silico-aluminate may be employed without the other. The bentonite reduces the average particle size, furnishing better flow and plating with the pigment. The silico-aluminate produces a substrate of lighter color.

The pigment composition may be incorporated in plastic powder for injection molding as follows: 1 part of dry composition is mixed with 16 parts of powdered polypropylene, in parts by weight. The mixture is tumbled for several hours while subjected to radiant heating to remove moisture. The product may be charged to an injection molding machine.

EXAMPLE 7

A pigment composition is prepared in the same manner as described in Example 6, employing 600 gms. of the silico-aluminate powder instead of 840 gms., and adding 200 gms. of titanium dioxide, in Composition 3. The pigment product of this example has much greater opacity than that of Example 6.

EXAMPLE 8

A pigment composition is prepared in the same manner as described in Example 6, employing any of the following materials as substrates in place of the silico-aluminate and bentonite in Composition 3, in the quantities and with the amounts of water indicated:

| Material | Amount of Material, gms. | Amount of Water, ml. |
| --- | --- | --- |
| Kaolin clay (Ultra White 90) [1] | 400 | 2,000 |
| Calcium carbonate, precipitated (Surfex MM) [2] | 2,000 | 2,000 |
| Barium sulfate | 200 | 2,000 |
| Alumina, colloidal powder (Baymal) [3] | 100 | 2,000 |
| Silica, micron-sized powder (Syloid 63) [4] | 100 | 1,000 |
| Cellulose, microcrystalline (Avicel) [5] | 200 | 2,000 |
| Polyethylene, powder (Microthene FN 500) [6] | 200 | 2,000 |

[1] Having the following properties:
    Particles finer than 2 microns, percent ---- 92–94
    Maximum residue wet, 325 mesh, percent ---- 0.005
    pH range ---- 6.3–7.0
[2] Having the following composition and properties:
    $CaCO_3$, percent ---- 96.8
    $MgCO_3$, percent ---- 0.45
    $CaSO_4$, percent ---- 0.40
    pH ---- 9.7
    Particle size range ---- 0.05–1
    Residue wet, 300 mesh, percent ---- 0.001
    Coating, percent resin ---- 1
[3] Boehmite (AlOOH) alumina fibrils, having the following composition and properties:
    AlOOH, percent ---- 83.1
    $CH_3COOH$, percent ---- 9.8
    $SO_4$, percent ---- 1.7
    Water, percent ---- 5.0
    pH, 4% solution ---- 4.3
[4] Having the following compositions and properties:
    $SiO_2$, percent ---- 99.73
    Average particle size, microns ---- 10
    pH, 5% solution ---- 4.2
[5] Non-fibrous powder having the following composition and properties:
    Moisture, percent ---- 4±0.5
    Ash, p.p.m., max. (ignition) ---- 300
    Organic extractables, p.p.m., max ---- 300
    Average particle size, microns ---- 38
    Particle size range below 1 to 100 microns.
[6] Average particle size less than 20 microns. Use minimum of 0.2% of surfactant based on total weight of final mixture.

Where necessary, the pH of the mixture of Composition 1 and Composition 3 is adjusted to below about 7 by the addition of dilute hydrochloric acid, prior to the addition of aluminum chloride.

EXAMPLE 9

A pigment composition having a transparent extended substrate is made in the same manner as Example 6, substituting 680 gms. (dry basis) of preformed alumina hydrate for the silico-aluminate and bentonite. The alumina hydrate is prepared as follows: an aqueous 18% solution of 5 parts by weight of sodium carbonate (anhydrous) is added to an aqueous 18% solution of 10 parts by weight of aluminum sulfate ($18H_2O$). A precipitate of alumina hydrate forms, is separated by filtration, and is washed with aqueous 20% sodium chloride solution.

EXAMPLE 10

A pigment composition having a transparent substrate is made as follows: The following composition is heated at 140° F. and shear mixed for 15 minutes:

Composition 4

Water ---- ml-- 2000
Acid Blue 9 (Erioglaucine), 30% aqueous solution ---- gms-- 650
Sodium lignosulfonate, 61.5% (Raylig TA) --gms-- 60
Silicone antifoam (Antifoam B) ---- ml-- 3

A solution of 15 ml. of hydrochloric acid (38%) in 150 ml. of water is added to the composition. A solution of 650 gms. of zirconium oxychloride ($ZrOCl_2 \cdot 8H_2O$) in 1500 ml. of water is added to the composition, and the resulting solution is shear mixed with heating at 145–150° F. for 10–15 minutes.

A solution of 62 gms. of sodium carbonate (anhydrous) in 400 ml. of water is added to the foregoing solution at a flow rate of about 60 ml./min. while shear mixing. The temperature is maintained at 145–150° F. The resulting mixture is shear mixed for 10 minutes, when heating is discontinued.

The resulting mixture is laked for 1–5 hours with slow mixing. An equal volume of tap water then is added to the mixture. The pigment composition settles on standing in one hour. The pigment composition then is separated from the liquor and may be dried, as in Example 1.

Pigment compositions are made similarly employing any of the remaining dyes listed in Table I, in dye quantities of about 100–200 gms.

EXAMPLE 11

A pigment composition is made as follows: The following composition is heated at 170° F. and shear mixed for 15 minutes:

Composition 5

Water ---- ml-- 500
Tartrazine ---- gms-- 30–60
Sodium lignosulfonate, 61.5% (Raylig TO)-gms-- 15–30

The following composition is heated at 150° F. and shear mixed for 15 minutes:

Composition 6

Water ---- ml-- 500
Aluminum chloride ---- gms-- 124
Bentonite, powdered ---- gms-- 15
Silico-aluminate powder (Zeolex 7) ---- gms-- 200

Compositions 5 and 6 are mixed, and the following composition is added thereto at about 100 ml./min. while shear mixing, at 145–150° F.:

Composition 7

Water ---- ml-- 700
Sodium carbonate ---- gms-- 44.6
Sodium silicate (28% $SiO_2$) ---- gms-- 130

Shear mixing is continued for 15 minutes, when heating is discontinued. The pH of the mixture is about 4–5.

The resulting mixture is laked with slow mixing for 30–60 minutes. The pigment composition then is separated from the liquor by filtration and dried.

EXAMPLE 12

A pigment composition is made as follows: The following composition is shear mixed at 100° F. for 15 minutes:

Composition 8

Water ---- ml-- 1000
Tartrazine ---- gms-- 30–60
Sodium lignosulfonate, 61.5% (Raylig TA)-gms-- 15–30
Sodium silicate (28% $SiO_2$) ---- gms-- 130
Bentonite, powdered ---- gms-- 50

A solution of 31 gms. of sodium carbonate in 200 ml. of water is added to a solution of 325 gms. of zirconium oxychloride in 750 ml. of water at 120° F. The resulting solution is added to Composition 8 at 120° F., at about 60–100 ml./min. while shear mixing.

The resulting mixture is laked with slow mixing for 30–60 minutes at 120° F. The pH of the mixture is adjusted to 6–6.5 with hydrochloric acid. The pigment composition then is separated from the liquor by filtration and dried.

In this example and in Example 11, potassium silicate or organic ammonium silicate (Quram 223, Philadelphia Quartz Company) may be substituted for the sodium silicate, in equivalent amounts based on $SiO_2$ content.

EXAMPLE 13

A pigment composition is made according to any of Examples 1–12 employing in place of 60 gms. of sodium lignosulfonate (Raylig TA), any of the following lignin compounds in the proportions indicated:

| | Grams |
|---|---|
| Sodium lignosulfonate, sugar free (Raylig LA-74) | 25–50 |
| Sodium lignosulfonate, 30–40% (Maracarb N) | 80–160 |
| Calcium lignosulfonate, 90% (Toranil B) | 25–50 |
| Ammonium lignosulfonate, 59% (Orzan A) | 40–80 |
| Alkali lignin, sodium salt (Indulin B-) | 25–50 |

The invention thus provides very useful bleed-resistant pigment compositions and a method of making such compositions. The invention overcomes the problems occasioned by the pronounced bleeding tendencies of the acid and natural dyes. Existing uses of the dyes are markedly improved, and new applications of the dyes may be made.

While certain preferred embodiments of the invention have been described, it will be apparent that various changes and modifications may be made within the spirit and scope of the invention. It is intended that such changes and modifications be included within the scope of the appended claims.

I claim:
1. A method of making a pigment composition which comprises mixing a lake-forming amount of a soluble metal compound forming a hydrous metal oxide lake with an aqueous dispersion of a lignin and a dye selected from the group consisting of acid dyes and natural dyes, said lignin being employed in an amount sufficient to produce a bleed-resistant pigment composition, and providing a pH in said dispersion sufficient to precipitate said metal in a hydrous metal oxide lake.

2. A method as defined in claim 1 wherein said metal is selected from the group consisting of aluminum, chromium, cobalt, copper, iron, lead, magnesium, tin, titanium, zinc, and zirconium.

3. A method as defined in claim 1 wherein said lignin is selected from the group consisting of alkali lignins and lignosulfonates.

4. A method as defined in claim 1 wherein said dye is selected from the group consisting of aminoketone, azo, indigoid, nitro, nitroso, triarylmethane, and xanthene dyes.

5. A method as defined in claim 1 wherein said dye is tetrazine.

6. A method as defined in claim 1 wherein said dye is acid blue 9.

7. A method as defined in claim 1 wherein said hydrous metal oxide lake is precipitated on a finely divided solid substrate.

8. A method as defined in claim 7 wherein the average particle size of said substrate is less than about 1 micron.

9. A method as defined in claim 7 wherein said substrate includes a clay mineral.

10. A method as defined in claim 1 wherein said metal is selected from the group consisting of aluminum, chromium, cobalt, copper, iron, lead, magnesium, tin, titanium, zinc, and zirconium, said lignin is selected from the group consisting of alkali lignins and lignosulfonates, and said dye is selected from the group consisting of aminoketone, azo, indigoid, nitro, nitroso, triarylmethane, and xanthene dyes.

11. A method as defined in claim 1 wherein said metal is aluminum and said lignin is selected from the group consisting of alkali lignins and lignosulfonates.

12. A method as defined in claim 1 wherein said metal is zirconium and said lignin is selected from the group consisting of alkali lignins and lignosulfonates.

13. A method as defined in claim 1 wherein said dispersion contains at least about 0.1 part of lignin per part of dye, in parts by weight.

14. A method of making a pigment composition which comprises mixing a lake-forming amount of a soluble metal compound forming a hydrous metal oxide lake with an aqueous dispersion of a lignin and a dye selected from the group consisting of acid dyes and natural dyes, said lignin being employed in an amount sufficient to produce a bleed-resistant pigment composition, mixing a soluble silicate with said dispersion, and providing a pH in said dispersion sufficient to precipitate said metal in a hydrous metal oxide-silicate lake.

15. A method as defined in claim 14 wherein said metal is selected from the group consisting of aluminum, chromium, cobalt, copper, iron, lead, magnesium, tin, titanium, zinc, and zirconium, said lignin is selected from the group consisting of alkali lignins and lignosulfonates, and said dye is selected from the group consisting of aminoketone, azo, indigoid, nitro, nitroso, triarylmethane, and xanthene dyes.

16. A method of making a pigment composition which comprises mixing a lake-forming amount of aluminum chloride with an aqueous dispersion of a lignin selected from the group consisting of alkali lignins and lignosulfonates, and a dye selected from the group consisting of acid dyes and natural dyes, said lignin being employed in an amount sufficient to produce a bleed-resistant pigment composition, and mixing sufficient alkaline material with said dispersion to precipitate said aluminum in a hydrous aluminum oxide lake.

17. A method of making a pigment composition which comprises mixing a lake-forming amount of an aluminum sulfate with an aqueous dispersion of a lignin selected from the group consisting of alkali lignins and lignosulfonates, and a dye selected from the group consisting of acid dyes and natural dyes, said lignin being employed in an amount sufficient to produce a bleed-resistant pigment composition, and mixing sufficient alkaline material with said dispersion to precipitate said aluminum in a hydrous aluminum oxide lake.

18. A method of making a pigment composition which comprises mixing a lake-forming amount of zirconium oxychloride with an aqueous dispersion of a lignin selected from the group consisting of alkali lignins and lignosulfonates, and a dye selected from the group consisting of acid dyes and natural dyes, said lignin being employed in an amount sufficient to produce a bleed-resistant pigment composition, and mixing sufficient alkaline material with said dispersion to precipitate said zirconium in a hydrous zirconium oxide lake.

19. A method of making a pigment composition which comprises providing an aqueous dispersion of at least about 0.1 part of a lignin and one part of a dye selected from the group consisting of acid dyes and natural dyes, mixing with said dispersion a soluble aluminum salt in an amount providing at least about 0.3 part of aluminum, and mixing with said dispersion sufficient alkaline material to precipitate said aluminum in a hydrous aluminum oxide lake, said parts being by weight.

20. A method of makng a pigment composition which comprises providing an aqueous dispersion of at least about 0.1 part of a lignin and one part of a dye selected from the group consisting of acid dyes and natural dyes, mixing with said dispersion a soluble zirconium salt in an amount providing at least about 0.8 part of zirconium, and mixing with said dispersion sufficient alkaline material to precipitate said zirconium in a hydrous zirconium oxide lake, said parts being by weight.

21. A pigment composition made by the method of claim 1.
22. A pigment composition made by the method of claim 13.
23. A pigment composition made by the method of claim 14.

References Cited

UNITED STATES PATENTS

| | | | |
|---|---|---|---|
| 1,930,853 | 10/1933 | Koller et al. | 106—289 |
| 1,956,921 | 5/1934 | Immerheiser et al. | 106—289 |
| 2,032,458 | 3/1936 | Adamson | 106—289 |
| 2,099,690 | 11/1937 | Holzach | 106—289 |

JAMES E. POER, Primary Examiner

U.S. Cl. X.R.

106—308, 309